G. C. BATTIN.
CANNER.
APPLICATION FILED APR. 2, 1918.

1,289,608.

Patented Dec. 31, 1918.
2 SHEETS—SHEET 1.

Witnesses
E. R. Ruppert
I. C. Wilcox

Inventor
G. C. Battin
By Victor J. Evans
Attorney

G. C. BATTIN.
CANNER.
APPLICATION FILED APR. 2, 1918.

1,289,608.

Patented Dec. 31, 1918.
2 SHEETS—SHEET 2.

Witness
E. R. Ruppert.
L. C. Wilcox.

Inventor
G. C. Battin
By Victor J. Evans
Attorney

UNITED STATES PATENT OFFICE.

GROVER C. BATTIN, OF ALMA, NEBRASKA.

CANNER.

1,289,608.

Specification of Letters Patent.   Patented Dec. 31, 1918.

Application filed April 2, 1918.   Serial No. 226,244.

*To all whom it may concern:*

Be it known that I, GROVER C. BATTIN, a citizen of the United States, residing at Alma, in the county of Harlan and State of Nebraska, have invented new and useful Improvements in Canners, of which the following is a specification.

This invention relates to canners and it consists in the novel features hereinafter described and claimed.

An object of the invention is to provide a canning apparatus of simple and durable structure especially adapted to be used for canning fruit and vegetables while they are in a heated condition, so that the vessels which contain the fruit or vegetables may be sealed while the air is expelled from the vessels or containers.

With this object in view the canner comprises a boiler adapted to retain a quantity of water and provided at its upper edge with inwardly disposed lugs. A frame is adapted to be inserted in the boiler and the frame is provided at its sides with upstanding standards having ears adapted to engage under the lugs of the boiler. The cans or jars which are to contain the fruit or vegetables are positioned upon the lower portion of the said frame. A handle member is pivotally connected with the upper ends of the standards. The frame includes a cross piece located at a point between the ends of the standards and a rod passing transversely through the said cross piece. Clamping devices are adjustably mounted upon the end portions of the rod and may be engaged against the upper portions of the containers which retain the fruit or vegetables whereby the said retainers are held in position upon the frame when the frame and the containers are immersed in the water which is in the boiler.

Figure 1:
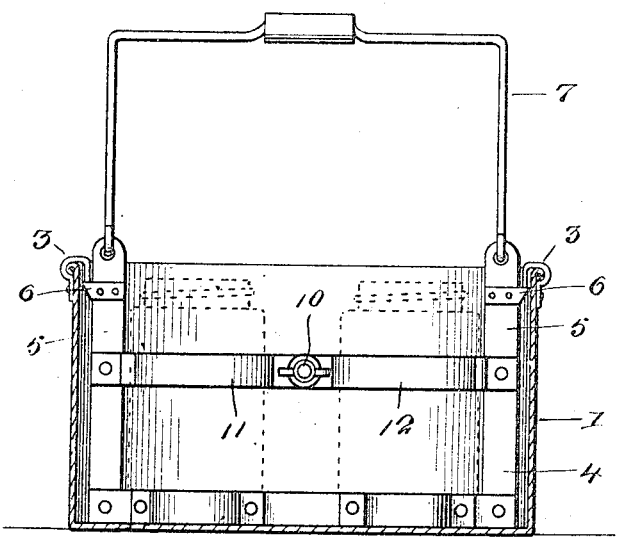
Figure 1 is a side view of the canner.
Figure 2:
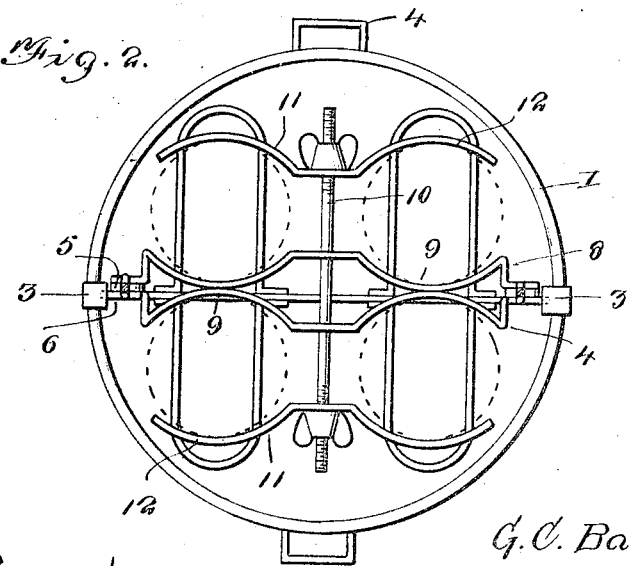
Fig. 2 is a top plan view of the same.
Figure 3:
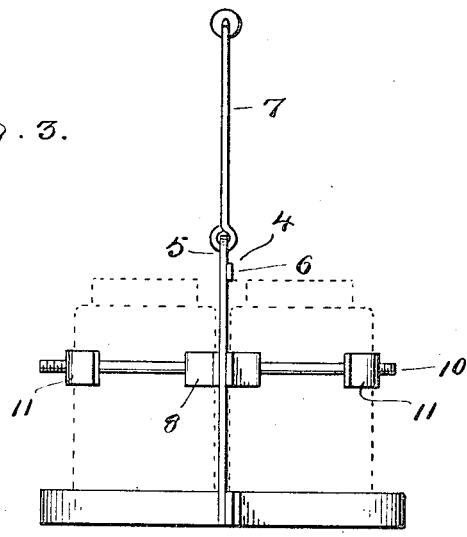
Fig. 3 is an end elevation of the frame of the canner.
Figure 4:
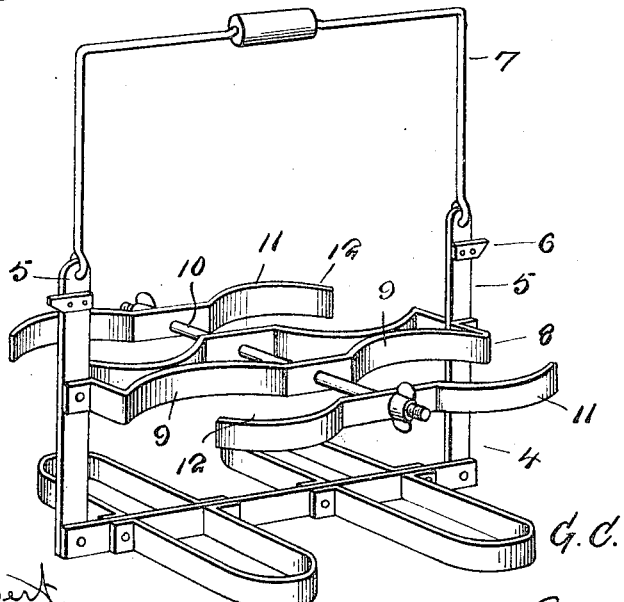
Fig. 4 is a perspective view of the said frame.

The canner comprises a boiler 1 in the form of a tub or similar receptacle the said boiler being provided at the outer surfaces of its sides with suitable handles 2. Lugs 3 are attached to the upper portion of the boiler 1 and extend inwardly over the upper edge thereof.

A frame 4 is adapted to be inserted in the boiler and the said frame is provided with an open bottom portion upon which the cans or vessels which retain the fruit or vegetables may rest. The frame also includes standards 5 which constitute the ends of the frame and these standards carry in the vicinity of their upper ends outstanding ears 6 which are adapted to engage under the lugs 3 when the frame is inserted in the boiler 1 and the frame is turned whereby the said ears are carried under the lugs. A bail handle 7 is pivotally connected with the upper ends of the standards.

The frame also includes a cross bar 8 which connects at its ends with the intermediate portions of the standards and the said cross bar is provided at its opposite sides with recesses 9 adapted to receive the side portions of jars or other containers which hold the fruit or vegetables.

A rod 10 passes transversely through the intermediate portion of the cross bar 8 and the jars or cans which contain the vegetables or fruit are positioned at the opposite sides of the crossbar when they are placed upon the bottom member of the frame. Retainer members 11 are adjustably mounted upon the end portion of the rod 10 and the said retainer members are provided in the vicinity of their ends with recesses 12 adapted to receive the outer portions of the jars or vessels which hold the fruit or vegetables.

It is apparent that the boiler 1 may be placed upon a heater and the frame 4 may be positioned in the boiler with the ears 6 engaged under the lugs 3. Empty jars may then be placed upon the frame and secured by the member 11 and a sufficient quantity of water may be poured into the boiler. Or on the other hand the water in the boiler may be brought to a boiling point before the frame is inserted. Thus the retainer members 11 will prevent the empty jars from floating in the water and will hold them down in the same while they are heating and while the fruit is being poured into the same. After the jars have been filled with fruit they may be sealed while they are still immersed in the water and then the frame may be lifted out of the boiler and the canning process is completed.

From the foregoing description taken in conjunction with the accompanying drawings it will be seen that a canner of simple and durable structure is provided and that the same may be conveniently and economically used for putting up fruit and vegetables and for effecting the sealing thereof while the fruit and vegetables are in a heated condition which will result in the prolongation of the period of preservation.

Having described the invention what is claimed is:

A canner comprising a boiler having inwardly disposed lugs located at its upper edge, a frame insertible in the boiler and including standards, ears carried by the standards and adapted to engage under the lugs, a bail connected with the standards, cross bars connected at their ends with the standards at points between the ends thereof and provided at their sides and end portions with recesses adapted to receive jars, a rod passing transversely through the cross bars and retainers adjustably mounted upon the rod and adapted to coöperate with the crossbars to hold the jars.

In testimony wherof I affix my signature.

GROVER C. BATTIN.

Copies of this patent may be obtained for five cents each, by addressing the "Commissioner of Patents, Washington, D. C."